US012299363B2

(12) United States Patent
Biton et al.

(10) Patent No.: US 12,299,363 B2
(45) Date of Patent: May 13, 2025

(54) SYSTEM AND METHOD FOR PRODUCING PERSONALIZED AND CUSTOMIZED HARDWARE COMPONENT BASED ON DESCRIPTION THEREOF

(71) Applicants: Moran Biton, Netanya (IL); David Mermelstein, Gitit (IL); Moshe Lahmy, Azait (IL)

(72) Inventors: Moran Biton, Netanya (IL); David Mermelstein, Gitit (IL); Moshe Lahmy, Azait (IL)

(73) Assignees: Pcbix Ltd., Isreal (IL); Moran Biton, Isreal (IL); David Mermelstein, Gitit (IL); Moshe Lahmy, Azait (IL)

( * ) Notice: Subject to any disclaimer, the term of this patent is extended or adjusted under 35 U.S.C. 154(b) by 292 days.

(21) Appl. No.: 17/052,644

(22) PCT Filed: May 6, 2019

(86) PCT No.: PCT/IB2019/053672
§ 371 (c)(1),
(2) Date: Nov. 4, 2020

(87) PCT Pub. No.: WO2019/215570
PCT Pub. Date: Nov. 14, 2019

(65) Prior Publication Data
US 2021/0240890 A1 Aug. 5, 2021

(51) Int. Cl.
*G06F 30/27* (2020.01)
*G06N 20/00* (2019.01)
(Continued)

(52) U.S. Cl.
CPC ............. *G06F 30/27* (2020.01); *G06N 20/00* (2019.01); *G06Q 10/06312* (2013.01); *G06Q 50/04* (2013.01); *G06F 2111/20* (2020.01)

(58) Field of Classification Search
CPC ...... G06F 30/27; G06F 2111/20; G06F 30/31; G06F 2111/16; G06F 30/32;
(Continued)

(56) References Cited

U.S. PATENT DOCUMENTS 7,263,672 B2 * 8/2007 Cox ..................... G06F 30/39
716/139
7,590,963 B2 * 9/2009 Petunin ................ G06F 30/39
716/137

(Continued)

*Primary Examiner* — Maurice L. McDowell, Jr.
(74) *Attorney, Agent, or Firm* — AlphaPatent Associates Ltd.; Daniel J. Swirsky

(57) ABSTRACT

The invention relates a system and method for producing component and product based on description thereof. The method retrieves, via a communications interface adapted to interact with a user through a communications link, an input from said user; parses the input to produce one or more keywords corresponds to the description; identifies a combination of one or more components from a pre-stored list components, a code for producing the one or more components, and cover; optimizes the identified combination of one or more components; generates at least one production file having at least one of a software code, a library file, an stereolithography (STL) file, or a gerber file from said optimized combination, the at least one production file is associated with the manufacturing process for producing the at least one hardware component. This method is automated to facilitate end-to-end manufacturing with user described specifications on a platform.

16 Claims, 4 Drawing Sheets

(51) Int. Cl.
*G06Q 10/0631* (2023.01)
*G06Q 50/04* (2012.01)
*G06F 111/20* (2020.01)

(58) Field of Classification Search
CPC ........ G06F 30/392; G06F 30/394; G06F 7/00; G06F 7/026; G06F 7/10; G06N 20/00; G06Q 50/04; G06Q 10/06312; G06Q 10/10; G10L 15/26; Y02P 90/30; G06T 15/00; G06T 19/00; G06T 19/006; G09G 3/00
See application file for complete search history.

(56) References Cited

U.S. PATENT DOCUMENTS

| | | | |
|---|---|---|---|
| 2004/0039561 A1* | 2/2004 | Montano ............... | G06F 9/4411 703/22 |
| 2005/0080502 A1* | 4/2005 | Chernyak ............... | G06F 30/00 716/112 |
| 2008/0222580 A1* | 9/2008 | Banerjee ................ | G06F 30/30 716/136 |
| 2009/0069920 A1* | 3/2009 | Franzen ................. | G06Q 10/06 700/97 |
| 2017/0300598 A1* | 10/2017 | Akavia .................. | G06F 30/00 |
| 2019/0057548 A1* | 2/2019 | Singh .................... | G09B 25/02 |
| 2019/0299536 A1* | 10/2019 | Putman ................. | B22F 10/20 |

* cited by examiner

SYSTEM AND METHOD FOR PRODUCING PERSONALIZED AND CUSTOMIZED HARDWARE COMPONENT BASED ON DESCRIPTION THEREOF

TECHNICAL FIELD

The present disclosure relates to the field of production, and in particular, to a system and method for producing personalized and customized hardware component (such as but not limited to an article or a substance or physical part or a tangible part that is manufactured or refined for sale) and a software (code) for producing personalized and customized hardware based on description thereof.

BACKGROUND

There exists today a wide variety of small, typically handheld, electronic appliances known generally as mobile internet devices, including in particular the vast array of products commonly known as mobile phones and tablets. In the current state of the art, all such devices are designed by their manufacturers to include a variety of hardware capabilities, such as cameras or positioning system receivers, selected by the manufacturer to address as many potential customers as possible. Similarly, manufacturers determine the form factor, that is, the size, shape, weight, color, and other physical attributes, of each product, with the goal to satisfy the greatest possible number of users with the fewest specific combinations. Finally, manufacturers configure the operating software of their devices to provide a variety of functions such that a particular function or related group of functions is performed in exactly the same way on as many device models as possible.

The practice of limiting the number of hardware and software combinations benefits the device manufacturers by reducing the complexity of the various systems and procedures they use for product development and manufacturing. The primary mechanism current manufacturer's use for determining what, exactly, a particular new product should look like and do is a complex function in which the costs and benefits of their existing capabilities interact with the desires of customers. In general, however, the desires of end users are considered entirely in the aggregate, as presented by wholesale customers such as wireless carriers and major retailers and occasionally as interpreted through observational research that categorizes people by seemingly sensible but ultimately arbitrary attributes.

Manufacturers recognize that individual end users and smaller groups of end users tend to have special needs for which the mass production processes described above cannot provide cost-effective point solutions.

The following is considered by the Applicant as the closest prior art: U.S. Pat. No. 7,233,885B1 discloses a computer assisted method for specifying a customized product, the method comprising: responsive to a request for product information from a user, identifying the product; if a standard product corresponds to the identified product: automatically initiating transmission of at least one document related to the standard product to the user in real-time; and if no standard product corresponds to the identified product: electronically forwarding the request for product information to an engineering entity. Certain exemplary embodiments comprise a computer-assisted method for designing a product, the method comprising: receiving a value for at least one design parameter related to a product from a user; if a value for each design parameter received from the user is within a pre-determined set for the design parameter, automatically designing predetermined aspects of the product responsive to the at least one of the design parameter value; and electronically providing a document regarding a designed product to the user. The electronics manufacturing arts have lacked a production arrangement that reduces overhead costs from both line set-up and production defects.

The electronics manufacturing have lacked a production arrangement that reduces overhead costs from both line set-up and production defects. Such an arrangement should minimize the need to reconfigure line equipment for production of a different PCBA product (also interchangeable referred to hereinafter as "hardware component" or "article"). Preferably, such an arrangement would address these goals at all levels of the system design. Ideally, such a system would amplify its efficiency gains both by incorporating modern computerized process control technologies and by realizing the system responsiveness that human operators can provide.

What is needed, then, is an automatic system and method for producing personalized and customized hardware component (such as but not limited to an article or a substance or physical part or a tangible part that is manufactured or refined for sale) and a software (code) for producing personalized and customized hardware component based on description thereof.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY

The present disclosure relates to the field of production, and in particular, to a system and method for automated producing personalized and customized hardware a product based on the verbal description thereof.

Accordingly, an aspect of the present disclosure relates to computer implemented method for generating a manufacturing process along with code for producing at least one hardware component including its cover. The computer implemented method can include retrieving verbal description, via a communication interface adapted to interact with a user through a communications link, an input from said user, the input is associated with a description of said at least one hardware component; parsing, at a processor of a computing device, the input to produce one or more keywords corresponds to the description; identifying, at the processor, at least a combination of one or more components from a pre-stored list components, a code for producing the one or more components and cover for the one or more components, the combination of one or more components is identified by matching the one or more produced keywords with at least a description associated with each of components available in the pre-stored list of components; optimizing, at the processor, the identified combination of one or more components; generating, at the processor, at least one production file having at least one of a software code, a library file, an stereolithography (STL) file, or a gerber file from said optimized combination, the at least one production file is associated with the manufacturing process for producing the at least one hardware component.

In an aspect, the computer implemented method can transmit, by the processor, said at least one production file generated to one or more manufacturing machine for the manufacturing process for producing the at least one hardware component.

In an aspect, the computer implemented method can optimize, at the processor, positions of one or more subcomponents associated the at least one hardware component, as presented on a display of the computing device, available in the at least one production file.

In an aspect, the computer implemented method can auto route, at the processor, a final electronic parts placement and connection schemes, as presented on a display of the computing device, available in the at least one production file.

In an aspect, the computer implemented method can re-design, as presented on a display of the computing device, wirings available in the at least one production file.

In an aspect, the computer implemented method at the processor, to generate the code for operation of the described embodiment. The code is generated according to the electrical scheme and user described specifications.

In an aspect, the computer implemented method, at the processor, for manufacturing of cover for the hardware component produced in the final step. The cover is generated using proprietary and/or genetic algorithm to connect the parts and components and to assemble a complete 3D cover model as per user described specification.

In an aspect, the computer implemented method, at the processor, for manufacturing of cover, may be done in parallel with product manufacturing or can be done in the beginning or at the end of the manufacturing of the product. Basically the manufacturing of cover depends upon the user specification.

In an aspect, identifying, optimizing, and generating operations are performed by a pre-stored artificial intelligence algorithm being executed by the processor of the computing device.

In an aspect, said steps of identifying, optimizing, and generating operations are performed by a pre-stored machine learning algorithm being executed by the processor of the computing device.

In an aspect, the method can modify the manufacturing process using one or more pre-stored augmented reality techniques.

In an aspect, the input is received in the form of any or combination of contents selected from a text, an image, an audio, a video, or an animation.

Another aspect of the present disclosure relates to a computing device to generate a manufacturing process to produce at least one hardware component. The computing device includes an input/output (I/O) interface to retrieve an input from said user, the input is associated with a description of said at least one hardware component via a communications interface adapted to interact with a user through a communications link, a parser to parse the input to produce one or more keywords corresponds to the description, a combination identifier to identify at least a combination of one or more components from a pre-stored list components, an combination optimizer optimize the identified combination of one or more components, and a manufacturing file generator to generate at least one production file having at least one of a software code, a library file, an stereolithography (STL) file, or a gerber file from said optimized combination.

In an aspect, the combination of one or more components is identified by matching the one or more produced keywords with at least a description associated with each of components available in the pre-stored list of components.

In an aspect, the production file is associated with the manufacturing process for producing the at least one hardware component.

Another aspect of the present disclosure relates to a method for producing a product from a verbal description thereof. The method can include the steps of: providing a description of the product by natural language, detecting in the description keywords related to (a) code for operating the product, (b) electronics of the product, and (c) a case of the product.

In accordance to detected keywords of code, electronics and case of the product (a) retrieving from a database general components combinations; (b) optimizing the retrieved components combinations; (c) generating production files including code and libraries files, STL files and Gerber files from the combination.

The method can include the steps of optimizing PCB position within the case model; auto routing to a final electronic parts placement and connection schemes, auto-generate a code for producing the one or more components, and producing and/or manufacturing a 3D cover for the one or more components; designing wiring between electronics parts to PCB; sending the production files to manufacturing machines; and manufacturing the product by the manufacturing machines.

In an aspect, the detecting is carried out using artificial intelligence analysis.

According to one aspect of the invention, the optimization includes re-designing the product using augmented reality techniques.

In another aspect, the present invention is directed to a system for producing a product from a verbal description thereof. The system can include an input device, for inputting a verbal description of a product, and converting thereof to a sentence; a keywords detector, for detecting in the sentence keywords with regard to code, electronics and case of a product; a code database, for storing therein code components for later use; an electronic database, for storing therein information of electronic components and combinations thereof; a case database, for storing therein information of case components and combinations thereof; a code module, for generating code and libraries according to code related keywords and related information stored in the code database; an electronic module, for generating Gerber files according to electronic related keywords and related information stored in the electronic database; a case module, for producing STL files according to case related keywords and related information stored in the case database; an optimizer, for optimizing PCB dimensions and location of electrical components in the case; and one or more manufacturing machines, for manufacturing the product from the generated Gerber, STL and Code files.

In an aspect, the optimizing of the PCB might require further operations such as changing PCB size, shape and splitting into multiple PCB.

In an aspect, the optimizing the cover requires operations such as scaling, change in material and textures, changing the position of electrical components and other such operations to properly manufacture the cover, which fits the product.

In an aspect, the input device comprises ability to input audio signals.

In an aspect, the input device further comprises ability to input an image.

In an aspect, the input device further comprises ability to input an augmented reality scan.

In an aspect, the keywords detector employs artificial intelligence analyzing ability.

In an aspect, the keyword detector employs speech processing and natural language processing along with denoising.

This method is automated to facilitate end-to-end manufacturing of a customized product with user described specifications on a platform. The platform may be a web-defined platform and/or a platform running or executing computer implemented instructions.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

Figure 1:
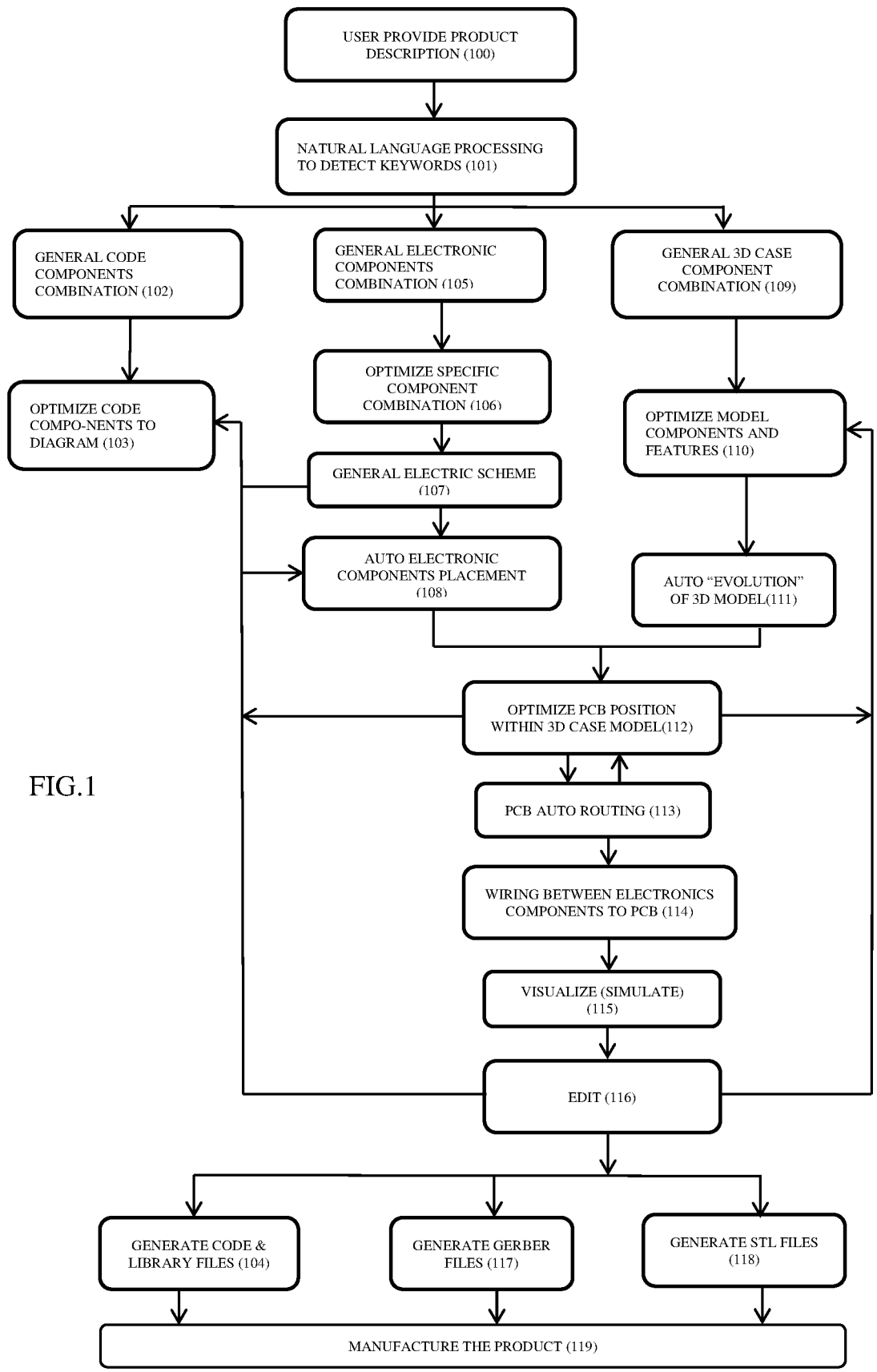
FIG. 1 is a block diagram schematically illustrating a method for producing a product from a verbal description thereof, according to one embodiment of the invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art.

The general principles defined herein may be applied to other embodiments and applications without departing from the scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The present disclosure relates to the field of production, and in particular, to a system and method for producing a product personalized and customized hardware component based on description thereof.

In an exemplary implementation, the present invention can be implemented using one or more Internet of Things (IoT) devices. For example, a computing device can be an IoT device or a manufacturing device can be an IoT device. The manufacturing device can be any manufacturing machine such as but not limited to Wafer Manufacturing System, High Rigid Grinder, Probing Machines, Dicing Machines or 3D printers and include electronic components such as but not limited to resistors, capacitors, diodes, and transistors are formed directly onto the surface of a silicon crystal.

In another exemplary implementation, the computing device and/or the manufacturing machine can be embedded with/incorporated with one or more Internet of Things (IoT) devices.

In a typical network architecture of the present disclosure can include a plurality of network devices such as transmitter, receivers, and/or transceivers that may include one or more IoT devices.

As used herein, the IoT devices can be a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a Wi-Fi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio.

IoT devices may include home automation network devices that allow a user to access, control, and/or configure various home appliances located within the user's home or outside of the user's home. Network device may include a home automation switch that may be coupled with a home appliance. In some embodiments, network devices may be used in other environments that can support a local area network to enable communication with network devices.

A user may communicate with the network devices using an access device that may include any human-to-machine interface with network connection capability that allows access to a network. For example, the access device may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device may include a cellular or other broadband network transceiver radio or interface, and may be configured to communicate with a cellular or other broadband network using the cellular or broadband network transceiver radio. In some embodiments, the access device may not include a cellular network transceiver radio or interface.

User may interact with the network devices using an application, a web browser, a proprietary program, or any other program executed and operated by the access device. In some embodiments, the access device may communicate directly with the network devices (e.g., communication signal). For example, the access device may communicate directly with network devices using Zigbee™ signals, Bluetooth™ signals, WiFi™ signals, infrared (IR) signals, UWB signals, WiFi-Direct signals, BLE signals, sound frequency signals, or the like. In some embodiments, the access device may communicate with the network devices via the gateways and/or a cloud network.

Local area network may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, Ethernet, powerline, Ethernet over coaxial cable, digital signal line (DSL), or the like). The wired and/or wireless networks may be implemented using various routers, access points, bridges, gateways, or the like, to connect devices in the local area network. For example, the local area network may include gateway and gateway. Gateway can provide communication capabilities to network devices and/or access device via radio signals in order to provide communication, location, and/or other services to the devices. The gateway is directly connected to the external network and may provide other gateways and devices in the local area network with access to the external network. The gateway may be designated as a primary gateway.

The network access provided by gateway may be of any type of network familiar to those skilled in the art that can support data communications using any of a variety of commercially-available protocols. For example, gateways may provide wireless communication capabilities for the local area network using particular communications protocols, such as WiFi™ (e.g., IEEE 802.11 family standards, or other wireless communication technologies, or any combination thereof). Using the communications protocol(s), the gateways may provide radio frequencies on which wireless enabled devices in the local area network can communicate. A gateway may also be referred to as a base station, an access point, Node B, Evolved Node B (eNodeB), access point base station, a Femtocell, home base station, home Node B, home eNodeB, or the like.

Although the present subject matter is explained considering that the computing device 302 performs a method for generating a manufacturing process for producing at least one hardware component, the computing device 302 may be implemented as an application on a server. It may be understood that the computing device 302 may also be implemented in a variety of computing systems, such as a laptop computer, a desktop computer, a notebook, a workstation, a server, a network server, a cloud-based environment, and the like.

It would be appreciated that the computing device 302 may be accessed by multiple users (not shown), through its interface, or applications residing on the computing device 302. Examples of the computing device 302 may include, but are not limited to, a portable computer, a personal digital assistant, a handheld device such as mobile phones and smart phones, a workstation, and a cloud-based environment.

In one implementation, a network can be a wireless network, a wired network or a combination thereof. The network can be implemented as one of the different types of networks, such as intranet, local area network (LAN), wide area network (WAN), the internet, and the like. Further, the network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 104 can include a variety of network devices, including routers, bridges, servers, computing devices, storage devices, and the like.

In an implementation, the computing device 302 (which may include multiple devices in communication in a hard-wired or wireless environment) may include at least one of the following: a mobile wireless device, a smartphone, a mobile computing device, a wireless device, a hard-wired device, a network device, a docking device, a personal computer, a laptop computer, a pad computer, a personal digital assistant, a wearable device, a remote computing device, a server, a functional computing device, or any combination thereof. While, in one preferred and non-limiting embodiment, the primary computing device 108 is a smartphone (which may include the appropriate hardware and software components to implement the various described functions), it is also envisioned that the computing device 302 be any suitable computing device configured, programmed, or adapted to perform one or more of the functions of the described system.

The present invention will be understood from the following detailed description of preferred embodiments ("best mode"), which are meant to be descriptive and not limiting.

For the sake of brevity, some well-known features, methods, systems, procedures, components, circuits, and so on, are not described in detail. The present invention tremendously reduces the planning and production time in comparison to the prior art. For example, the time from describing a product in natural language such as "a wireless vacuum cleaner for a synthetic grass having 300 WSP pumping power" up to obtaining design charts, end to end simulation and production files, may take several minutes.

The present invention also allows learning from previous designs, so that when a user defines a product that contains elements that have already been designed in previous products, these elements may be used for the new planned product.

FIG. 1 is a block diagram schematically illustrating a method for producing a product from a verbal description thereof, according to one embodiment of the invention.

Block 100: Product description request by a user. At block 100, a user describes a product in natural language. For example, "a device that turns on a LED alert when temperature is above 35 Celsius degrees". It should be noted that the product description may be provided by text, image, sound, a combination thereof, and so forth.

Actually, this is all the user must do. At the end of the process, a system based on the present invention generates production files, such as in Gerber format for printed circuits boards, STL files for 3D printing of the casing, and so on.

Block 101: Natural language processing to detect keywords. At block 101, the system analyzes the description provided by the user for detecting keywords of three categories: (a) 3D model, (b) electronics, and (c) code.

Preferably, the keywords may also be detected by speech analysis and artificial intelligence analysis. Blocks 102 to 104 deal with code design. The code may be of a CPU, an integrated circuit, and the like.

Block 102: General code components combination. At block 102, the system retrieves from a database thereof code components and features such as: network, control, logic, components and components functions. An example of such code may be:

IF_THEN_:_>35, ON
COMPONENT1:DS18B20
FUNCTION1:GET_DATA
COMPONENT2: LED
FUNCTION2: ON/OFF

Block 103: Code components optimization to diagrams. At block 103, the system optimizes code blocks into code diagrams according to given code blocks and electric schemes.

For Example:
IF_:DS18B20.GET_DATA>35
THEN_:LED-55MM.ON

For example: The electric scheme is provided by the electronics design module.

Block 104: Generate code and libraries files. At block 104, the system converts the code diagrams into full code files and libraries, according to main CPU assigned to the product by the electronic model. Blocks 105 to 108 deal with the electronics design, such as a PCB (Printed Circuit Board).

Block 105: General electronic components retrieval. At block 105, the system retrieves from database electronics components and features, a combination of required components such as: batteries, power connectors, convertors, communication, sensors, etc. The combination of the components may be of general components or specific components, in accordance with the user description provided in block 100. (For example, "battery" is a general term; "2 AAA batteries of 1.5V each" is a specific term).

Block 106: Optimize specific components combination. At block 106, the system optimizes combination request to final specific components, according to electrical stability, efficiency, price, etc., such as Battery/Rechargeable/Cn18650, Cpu/Avr/Atmega644, Sensor/Temperature/DS18B20, Sensor/Led/5 mm.

Block 107: Generate electronic scheme. At block 107, the system retrieves electric schemes of given components combination from the database. Using this information scheme diagrams and connection between electronics parts can be shown. The information obtained at this block is provided to the code module in order to optimize the code according to the selected electric and electronic components in accordance with the Natural Language processing (NLP) of user described method.

Block 108: Auto electronic components placement. At block 108, the system optimizes electronics parts placement on a grid, according to: user condition (specific position, grid size, etc.), given electric scheme, optimization rules, electric rules, temperature, efficiency, price, etc.

Blocks 106, 107 and 108 can be repeated until the result is "satisfactory". The definition of satisfactory can be defined to the system, or deduced from the input of the user. For example, an input phrase such as "a cheap device for turning on a LED alert when temperature is above 35 Celsius degrees" orients the system to optimize the cost of the designed device.

Blocks 109 to 111 deal with a 3D model design, such as a case of the device. Block 109: General 3D case components combination. At block 109, the system retrieves from the database the casing components and features, combination of required components (doors, engines, chairs, etc.) and features blocks (text, color, texture, etc.). For example: COMPNENT: 3D BOX Block 110: Optimize 3D model components and features.

At block 110, the system optimizes the case specific components and features, according to case stability, efficiency, and case connection scheme. 5 For example: OPTIMIZE PCB DIMENSIONS AND FEATURES.

Block 111: Auto "evolution" of 3D model (case). At block 111, the system optimizes the case parts connection on 3D grid, according to user conditions and thereby utilizing artificial intelligence learns user preferences, user style, user's behaviour, etc. (specific position, material, texture, etc.), given case connection scheme, optimization rules, material rules, temperature, efficiency, and price.

Block 112: Find best position for PCB inside 3D model (case). At block 112, the system optimizes PCB position within 3D case model, i.e., finds its best location on the casing while taking in consideration the physical periphery suitable for PCB, pivot. In order to reach maximum efficiency, electronic (PCB size, number of PCB, components size) and case (scale, material, components), solutions may repeat some of the electronic related and 3D model related steps.

Block 113: PCB auto routing. At block 113, the system auto routes to a final electronic parts placement and connection schemes. If auto routing is not possible, the optimization step (step 112) is repeated.

Block 114: Wiring between electronic components to PCB. At block 114, the system plans the wiring between electronics parts to PCB, since some electronics parts position are on case (battery, lights, sensors, engines, etc.). At block 115, the system allows visualization (simulation) of the product.

At block 116, the system allows the user to edit the generated design, such as replacing one component with another. The user may order the system to continue with the flow or to repeat a previous stage.

Block 117: Generate Gerber files Block 118: Generate STL files. Block 119: Manufacture the product. The production ends in block 119 in which the product is manufactured using the production files (Gerber files, STL files, code and libraries files).

A Gerber format is a format of 2D binary image. It is the de facto standard used by printed circuit board (PCB) industry software to describe the printed circuit board images: copper layers, solder mask, legend, etc.

An STL format is a widely used rapid prototyping, 3D printing and computer-aided 5 manufacturing. Once the production files (Code files, Gerber files and STL files) have been generated, they are sent to auto manufacture machines, which manufacture the product.

Figure 2:
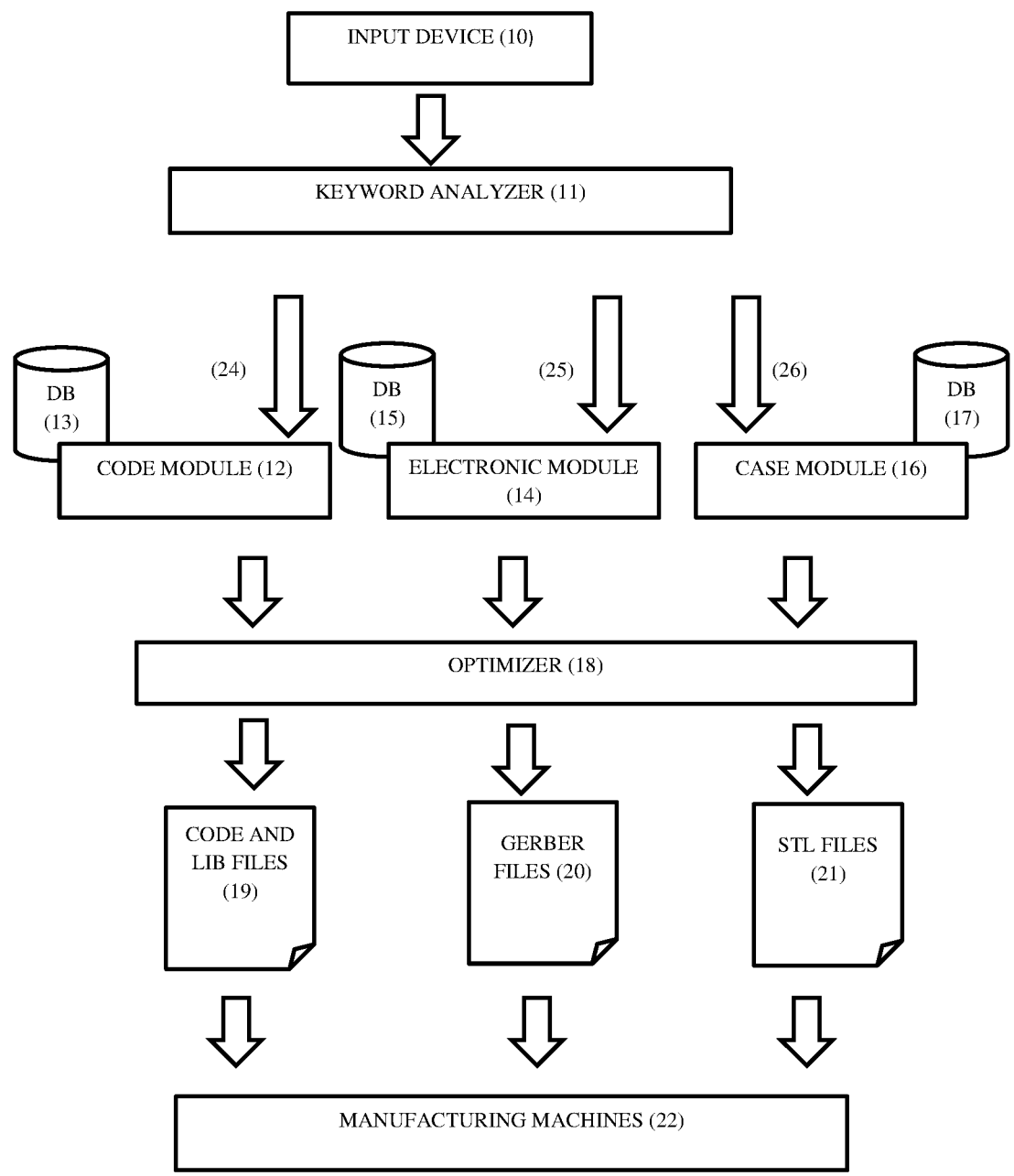
FIG. 2 is a block diagram schematically illustrating a system for producing a product from a verbal description thereof, according to one embodiment of the invention.

FIG. 2 is a block diagram schematically illustrating a system for producing a product from a verbal description thereof, according to one embodiment of the invention.

Reference numeral 10 denotes an input device, for inputting a description of a product by a user in natural language, according to one embodiment of the invention.

The output of the input device 10 is a textual sentences but the input device need not necessarily be a keyboard. A microphone may be used for recording a user, a camera for inputting an image, an AR scan (Augmented Reality Scan), and so on. For example, a user may scan a coffee machine, and specify specific features such as pressure, size of the water tank, and so on. The input device 10 is provided with the ability to turn the input into a sentence. Of course, a user may edit the sentence. The input may be of one or more products. For example, "a toy car operated by a remote control". Or, "a network whose nodes have the ability to intercommunicate with each other, as well as an upper network". In this case, some of the elements involved are a repeater, a gateway, a cloud.

Once a user provides a description of a product, keywords analyzer 11 detects keywords related to three subjects: code, electronics and case of a product.

The code related keywords 24 are provided to a code module 12; the electronic related keywords 25 are provided to an electronic module 13; and the case related keywords 26 are provided to a case module 16.

The code module retrieves from a database 13 thereof code components and combinations thereof; the electronic module retrieves from a database 15 thereof electronic components and combinations thereof; and the case module retrieves from a database 17 thereof case components and combinations thereof.

An optimizer 18 optimizes the design previously made by the code, electronic and case modules. If necessary, all or part of the code, electronic and case module are again activated on the optimized results. In the optimization process the product may be re-designed using augmented reality techniques.

The optimizer 18 then generates production files including code and libraries files 19, Gerber files 20 and STL files 21. These files are directed to manufacturing machines 22, which manufacture the product. 5 The code, electronic and case modules, and optimizer are software tools.

In the figures and/or description herein, the following reference numerals (Reference Signs List) have been mentioned:

numeral 10 denotes an input device;
numeral 11 denotes a keyword analyzer;
numeral 12 denotes a code module;
numeral 13 denotes a code database;
numeral 14 denotes an electronic module;
numeral 15 denotes an electronic database;
numeral 16 denotes a case module;
numeral 17 denotes a case database;
numeral 18 denotes a code, electronic and case optimizer;
numeral 19 denotes code and library files
numeral 20 denotes a Gerber file;
numeral 21 denotes an STL file; and
numeral 22 denotes manufacturing machines.

In the description herein, the following references have been mentioned: U.S. Pat. No. 7,233,885B1. The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

Figure 3:
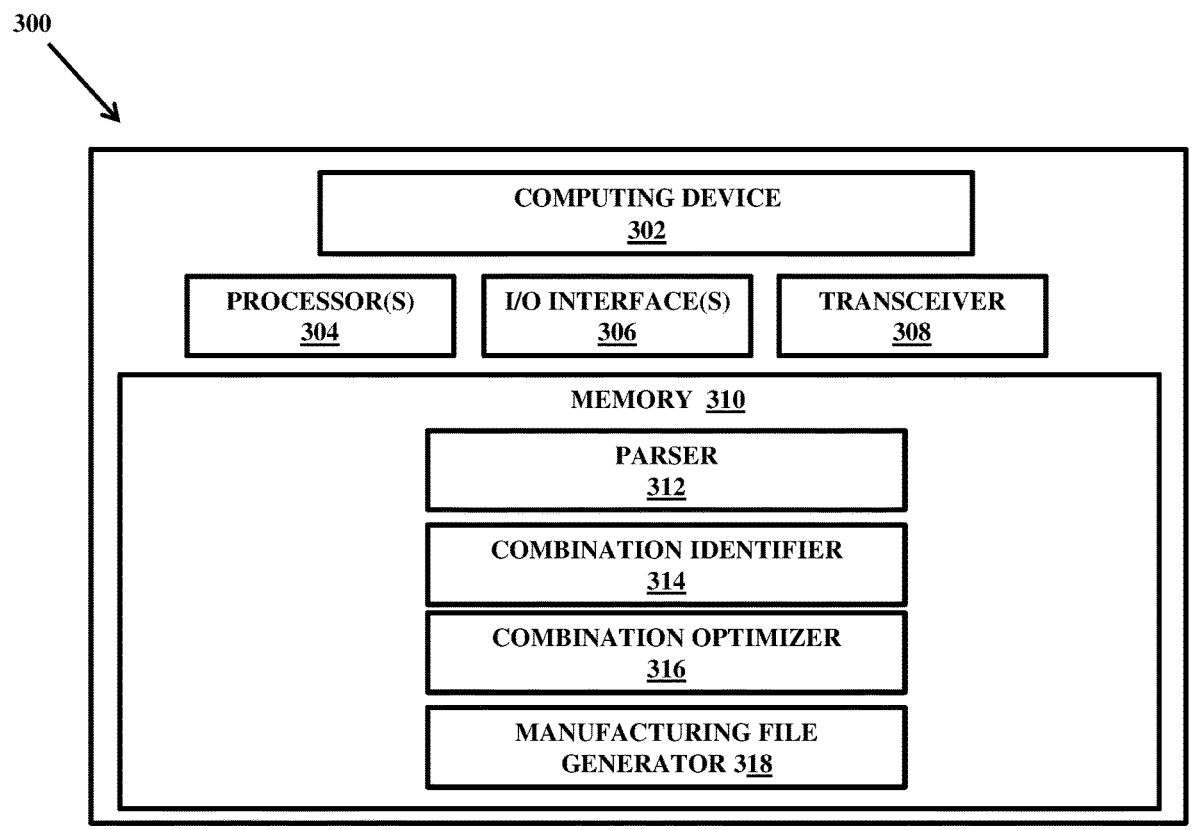
FIG. 3 illustrates exemplary functional modules of the proposed computing device, in accordance with an aspect of the present disclosure.

FIG. 3 illustrates exemplary functional modules 300 of the proposed computing device, in accordance with an aspect of the present disclosure. In an embodiment, the proposed computing device 302 may include at least one processor 304, an input/output (I/O) interface 306, a transceiver 308 and a memory 310. The at least one processor 304 may be implemented as one or more microprocessors, microcomputers, microcontrollers, digital signal processors, central processing units, state machines, logic circuitries, and/or any devices that manipulate signals based on operational instructions. Among other capabilities, the at least one processor 304 is configured to fetch and execute computer-readable instructions stored in the memory 310. The I/O interface 306 may include a variety of software and hardware interfaces, for example, a web interface, a graphical user interface, and the like. The I/O interface 306 may allow the proposed computing device 302 to interact with a user directly or through the client devices. Further, the I/O interface 306 may enable the computing device to communicate with other computing devices, such as web servers and external data servers (not shown). The I/O interface 306 can facilitate multiple communications within a wide variety of networks and protocol types, including wired networks, for example, LAN, cable, etc., and wireless networks, such as WLAN, cellular, or satellite. The I/O interface 306 may include one or more ports for connecting a number of devices to one another or to another server.

The memory 310 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 310 may include modules, routines, programs, objects, components, data structures, etc., which perform particular tasks or implement particular abstract data types.

In an aspect, the computing device 302 generates a manufacturing process to produce at least one hardware component. The computing device 302 includes an input/output (I/O) interface 306 to retrieve an input from said user, the input is associated with a description of said at least one hardware component via a communications interface or transceiver 308 adapted to interact with a user through a communications link, a parser 312 to parse the input to produce one or more keywords corresponds to the description, a combination identifier 314 to identify at least a combination of one or more components from a pre-stored list components, an combination optimizer 316 optimizes the identified combination of one or more components, and a manufacturing file generator 318 to generate at least one production file having at least one of a software code, a library file, an stereolithography (STL) file, or a gerber file from said optimized combination.

In an aspect, the combination of one or more components is identified by matching the one or more produced keywords with at least a description associated with each of components available in the pre-stored list of components.

In an aspect, the production file is associated with the manufacturing process for producing the at least one hardware component.

In an exemplary embodiment, the parser 312, the combination identifier 314, the combination optimizer 316, and the manufacturing file generator 318 may be present in the memory 310 of the computing device and can be performed/executed by the processor 304.

Figure 4:
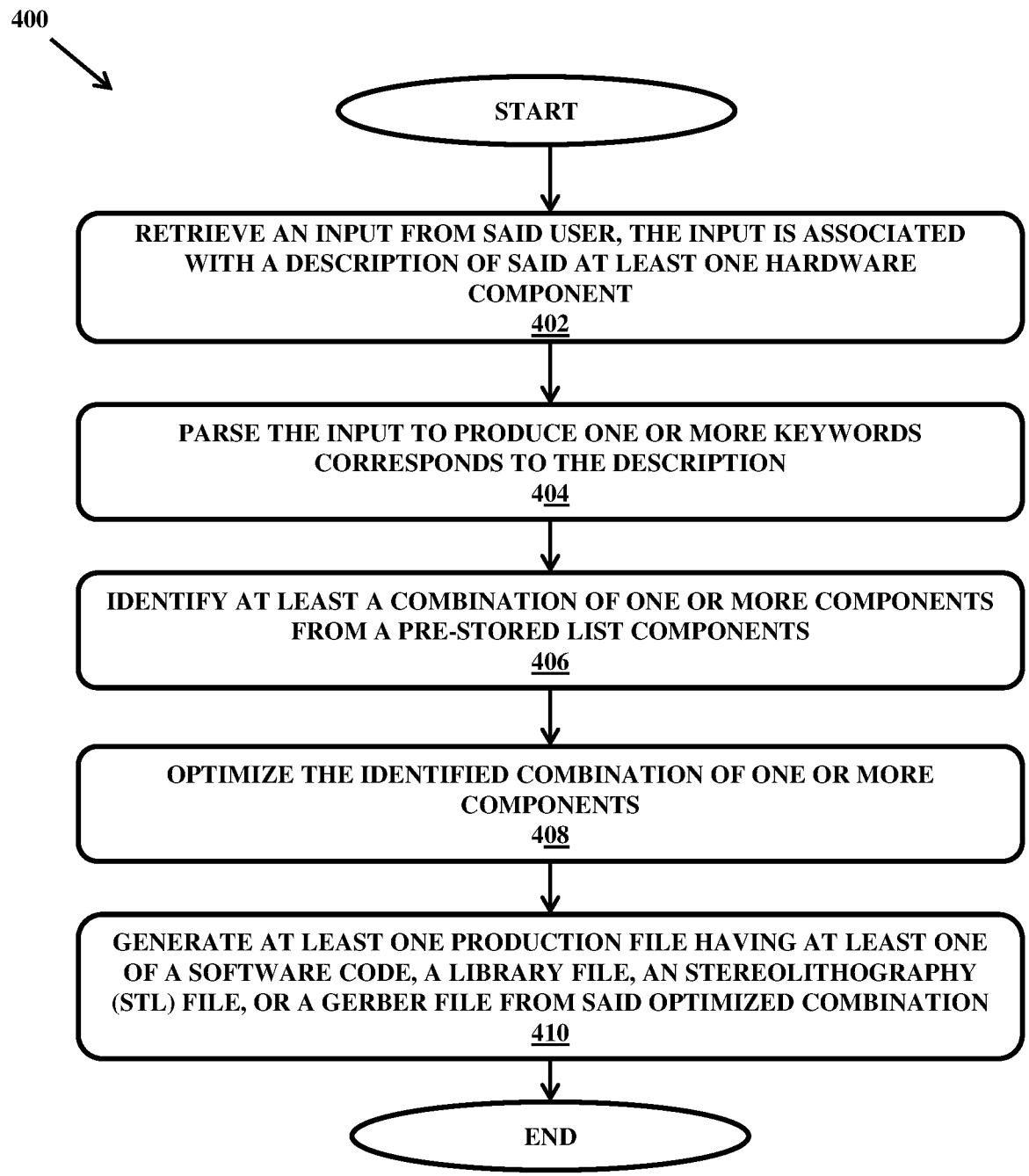
FIG. 4 illustrates exemplary flow diagram of the present system, in accordance with an embodiment of the present disclosure.

FIG. 4 illustrates an exemplary flow diagram 400 of the present system for generating a manufacturing process for producing at least one hardware component, in accordance with an embodiment of the present disclosure.

At step 402, retrieves an input from said user via a communications interface adapted to interact with a user through a communications link. The input is associated with a description of said at least one hardware component.

At step 404, the input is parsed by at a processor of a computing device to produce one or more keywords corresponds to the description;

At step 406, at least a combination of one or more components from pre-stored list components is identified at the processor. The combination of one or more components is identified by matching the one or more produced keywords with at least a description associated with each of components available in the pre-stored list of components.

At step 408, the identified combination of one or more components is optimized at the processor.

At step 410, at least one production file having at least one of a software code, a library file, a stereolithography (STL) file, or a gerber file is generated at the processor from said optimized combination. The at least one production file is associated with the manufacturing process for producing the at least one hardware component.

In an aspect, the computer implemented method can transmit, by the processor, said at least one production file generated to one or more manufacturing machine for the manufacturing process for producing the at least one hardware component In an aspect, the computer implemented method can optimize, at the processor, positions of one or more sub-components associated the at least one hardware component, as presented on a display of the computing device, available in the at least one production file.

In an aspect, the computer implemented method can auto route, at the processor, a final electronic parts placement and connection schemes, as presented on a display of the computing device, available in the at least one production file.

In an aspect, the computer implemented method can re-design, as presented on a display of the computing device, wirings available in the at least one production file.

In an aspect, identifying, optimizing, and generating is performed by a pre-stored artificial intelligence algorithm being executed by the processor of the computing device.

In an aspect, said steps of identifying, optimizing, and generating are performed by a pre-stored machine learning algorithm being executed by the processor of the computing device.

In an aspect, the method can modify the manufacturing process using one or more pre-stored augmented reality techniques.

In an aspect, the input is received in the form of any or combination of contents selected from a text, an image, an audio, a video, or an animation.

Various terms as used herein are shown below. To the extent a term used in a claim is not defined below, it should be given the broadest definition persons in the pertinent art have given that term as reflected in printed publications and issued patents at the time of filing.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure, as described in the claims.

In the present invention, unless otherwise clearly defined and limited, the term "mounted," "connected," "connected," "fixed" and other terms to be broadly understood, for example, can be a fixed connection, it can be detachable connection, or integrally; can be mechanically connected, or may be electrically connected; can be connected directly, or indirectly through the intermediary may be connected, may be interaction between the two internal communicating elements or two elements. Those of ordinary skill in the art, it can be understood that the above terminology specific meaning in the present invention, depending on the circumstances.

In the description of the present specification, reference to the term "one embodiment," "an embodiments", "an example", "an instance", or "some examples" and the description is meant in connection with the embodiment or example described The particular feature, structure, material, or characteristic included in the present invention, at least one embodiment or example. In the present specification, the term of the above schematic representation is not necessarily for the same embodiment or example. Furthermore, the particular features structures, materials, or characteristics described in any one or more embodiments or examples in proper manner. Moreover, those skilled in the art can be described in the specification of different embodiments or examples are joined and combinations thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A computer implemented method for generating a manufacturing process for producing at least one hardware component, said method comprising the steps of:
   retrieving, via a communications interface adapted to interact with a user through a communications link, an input from said user, the input is associated with a description of said at least one hardware component;
   parsing, at a processor of a computing device, the input to produce one or more keywords corresponding to the description;
   identifying, at the processor, at least a combination of one or more components from a pre-stored list of components, the combination of one or more components is identified by matching the one or more produced keywords with at least a description associated with each of the components available in the pre-stored list of components;
   optimizing, at the processor, the identified combination of one or more components;
   generating, at the processor, at least one production file having at least one of a software code, a library file, a stereolithography (STL) file, or a gerber file from said optimized combination, the at least one production file is associated with the manufacturing process for producing the at least one hardware component; and
   generating, at the processor, automatically a process for manufacturing of a cover for the at least one hardware component produced.

2. The computer implemented method of claim 1, wherein the computer implemented method further comprises transmitting, by the processor, said at least one production file generated to one or more manufacturing machines for the manufacturing process for producing the at least one hardware component.

3. The computer implemented method of claim 1, wherein the computer implemented method further comprises optimizing, at the processor, positions of one or more subcomponents associated with the at least one hardware component, as presented on a display of the computing device, available in the at least one production file.

4. The computer implemented method of claim 1, wherein the computer implemented method further comprises auto routing, at the processor, a final electronic parts placement and connection schemes, as presented on a display of the computing device, available in the at least one production file.

5. The computer implemented method of claim 1, wherein said steps of identifying, optimizing, and generating are performed by a pre-stored artificial intelligence algorithm being executed by the processor of the computing device.

6. The computer implemented method of claim 1, wherein said steps of identifying, optimizing, and generating are performed by a pre-stored machine learning algorithm being executed by the processor of the computing device.

7. The computer implemented method of claim 1, wherein the computer implemented method further comprises modifying the manufacturing process using one or more pre-stored augmented reality techniques.

8. The computer implemented method of claim 1, wherein the input is received in the form of one or more of contents selected from a text, an image, an audio, a video, or an animation.

9. A computer implemented method for generating a manufacturing process for producing at least one hardware component, said method comprising the steps of:

- retrieving, via a communications interface adapted to interact with a user through a communications link, an input from said user, the input is associated with a description of said at least one hardware component;
- parsing, at a processor of a computing device, the input to produce one or more keywords corresponding to the description;
- identifying, at the processor, at least a combination of one or more components from a pre-stored list of components, the combination of one or more components is identified by matching the one or more produced keywords with at least a description associated with each of the components available in the pre-stored list of components;
- optimizing, at the processor, the identified combination of one or more components;
- generating, at the processor, at least one production file having at least one of a software code, a library file, a stereolithography (STL) file, or a gerber file from said optimized combination, the at least one production file is associated with the manufacturing process for producing the at least one hardware component; and
- re-designing, as presented on a display of the computing device, wirings available in the at least one production file.

10. The computer implemented method of claim 9, wherein the computer implemented method further comprises transmitting, by the processor, said at least one production file generated to one or more manufacturing machines for the manufacturing process for producing the at least one hardware component.

11. The computer implemented method of claim 9, wherein the computer implemented method further comprises optimizing, at the processor, positions of one or more sub-components associated with the at least one hardware component, as presented on a display of the computing device, available in the at least one production file.

12. The computer implemented method of claim 9, wherein the computer implemented method further comprises auto routing, at the processor, a final electronic parts placement and connection schemes, as presented on a display of the computing device, available in the at least one production file.

13. The computer implemented method of claim 9, wherein said steps of identifying, optimizing, and generating are performed by a pre-stored artificial intelligence algorithm being executed by the processor of the computing device.

14. The computer implemented method of claim 9, wherein said steps of identifying, optimizing, and generating are performed by a pre-stored machine learning algorithm being executed by the processor of the computing device.

15. The computer implemented method of claim 9, wherein the computer implemented method further comprises modifying the manufacturing process using one or more pre-stored augmented reality techniques.

16. The computer implemented method of claim 9, wherein the input is received in the form of one or more of contents selected from a text, an image, an audio, a video, or an animation.

* * * * *